United States Patent Office 3,099,659
Patented July 30, 1963

3,099,659
STEROIDAL LACTONES
Fred A. Kincl and Howard J. Ringold, Mexico City, Mexico, assignors, by mesne assignments, to Syntex Corporation, a corporation of Panama
No Drawing. Filed Mar. 8, 1960, Ser. No. 13,426
23 Claims. (Cl. 260—343.2)

This invention relates to certain new cyclopentanophenanthrene derivatives and to a process for the production of the same.

More particularly, the invention relates to novel 19-nortestololactones and the dihydroallo-derivatives with or without a substituent at C–2 and which may have further unsaturation in ring A.

The novel compounds of the present invention are illustrated by the following formulae.

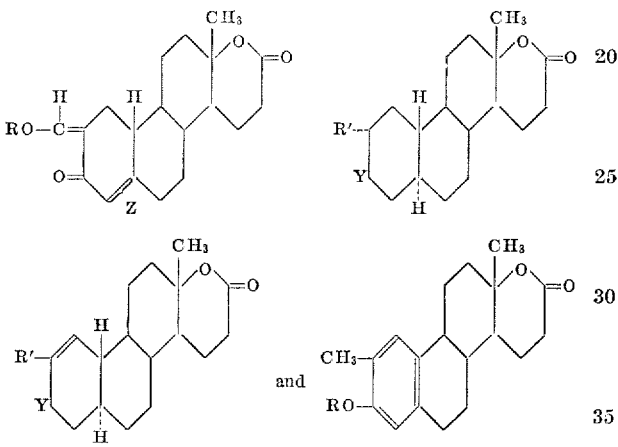

In the above formulae, R represents hydrogen or the acyl radical of a hydrocarbon carboxylic acid having up to about 12 carbon atoms and the radical of a hydrocarbon such as alkyl, aryl and aralkyl having up to about 8 carbon atoms; R' represents hydrogen or methyl; Y represents =O,

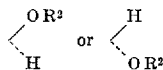

wherein $R^2$ represents hydrogen or the acyl radical of a hydrocarbon carboxylic acid having up to 12 carbon atoms; and Z represents a double bond between C–4 and C–5 or a saturated linkage between C–4 and C–5. Rings A and B of the steroid nucleus are in trans-position when the C–4-to-C–5 bond is saturated.

More specifically, among the new compounds corresponding to the above formulae, there are 2-hydroxymethylene-19-nor-testololactone,
19-nor-testololactone,
2-hydroxymethylene-4,5-dihydroallo-19-nor-testololactone,
4,5-dihydroallo-19-nor-testololactone,
2α-methyl-4,5-dihydroallo-19-nor-testololactone,
1-dehydro-4,5-dihydroallo-19-nor-testololactone,
2-methyl-1-dehydro-4,5-dihydroallo-19-nor-testololactone,
2α-methyl-19-nor-andrololactone,
2-methyl-1-dehydro-19-nor-andrololactone,
2-methyl-1-dehydro-19-nor-epi-andrololactone, and
2α-methyl-19-nor-epi-andrololactone.

The new compounds of this invention further comprise the esters of the aforementioned hydroxylated compounds formed with hydrocarbon carboxylic acids of up to about 12 carbon atoms, which acids are saturated or unsaturated, of straight, branched, cyclic or mixed cyclic-aliphatic chain, optionally substituted with functional groups (hydroxyl, acyloxy, of up to 12 carbon atoms), alkoxy (of up to 5 carbon atoms), halogen (fluorine, chlorine or bromine or other groups); typical new esters of such acids are, among others, the acetates, propionates, butyrates, hemisuccinates, enanthates, caproates, benzoates, trimethylacetates, phenoxyacetates, cyclopentylpropionates, phenylpropionates and β-chloropropionates. The hydrocarbon oxymethylene group at C–2 may be formed with an aliphatic alcohol of up to about 5 carbon atoms, with an aromatic alcohol or with a mixed aliphatic-aromatic alcohol. Typical alkoxy groups are the methoxy, ethoxy, and propoxy groups, and a typical aryloxy group is the benzoxy group.

The new compounds which are the object of the present invention, are anabolic drugs showing a favorable anabolic-androgenic ratio, and are gonadotrophin inhibitors, further possessing anti-estrogenic activity. Particularly, the compounds substituted at C–2 exhibit a higher activity by the oral route.

The novel compounds unsubstituted at C–2 of the following formula

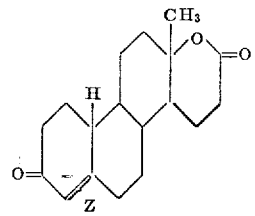

wherein Z has the meaning hereinabove set forth, which also serve as valuable intermediates for the preparation of the novel C–2 substituted compounds, are prepared by a process illustrated by the following Reaction Diagram I.

REACTION DIAGRAM I

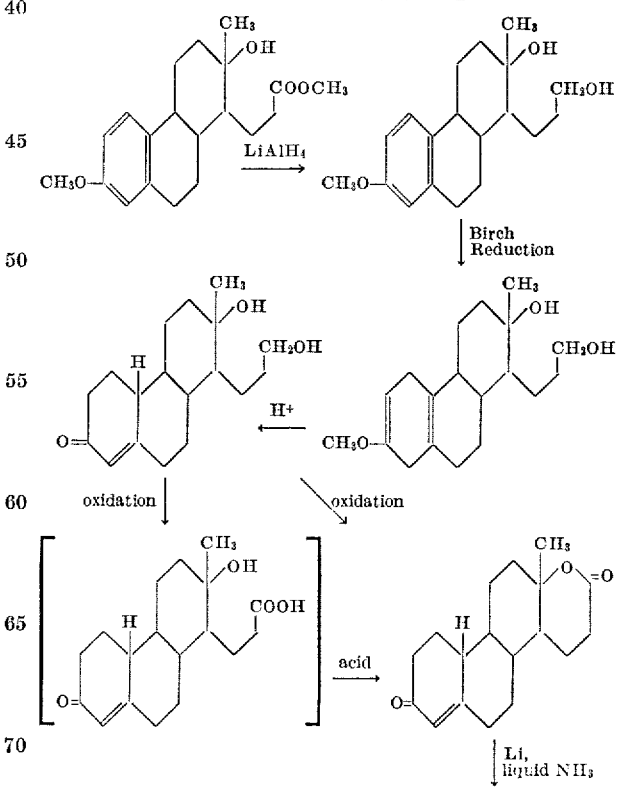

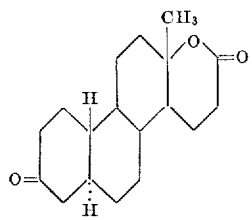
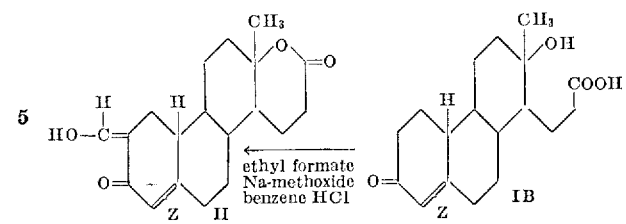
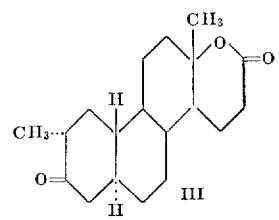

In practicing the process above outlined, the 3-methyl ether of methyl-estrololactonic acid described by Robert P. Jacobsen et al. in J. Biol. Chem., 171, 61 (1947), is refluxed with a double metal hydride such as lithium aluminum hydride in a solvent such as tetrahydrofuran, ethyl ether or dioxane to form the 3-methyl ether of 13:17-seco-1:3:5(10)-estratriene-3,13,17-triol which is then dissolved in a solvent such as Dowanol 33–B and submitted to a Birch reduction thus yeilding 13:17-seco-3-methoxy-2:5(10)-estradiene-13,17-diol. The ether group is then hydrolyzed by acidic treatment, preferentially with methanolic hydrochloric acid and the resulting 13:17-seco-4-estrene-13,17-diol-3-one is oxidized by treatment with chromic acid in aqueous acetic acid at room temperature or by other oxidizing agents such as chromic acid in acetone-aqueous sulfuric acid to form 13:17-seco-4-estrene-13-ol-3-one-17-oic acid; in this step, the major portion of the oxidized product is cyclized to the lactone. By acid treatment as with aqueous hydrochloric acid at room temperature for several hours, the lactonization is completed to give 19-nor-testololactone. By treatment of 19-nor-testololactone with an alkali metal or an alkaline earth metal in liquid ammonia, the double bond at C–4,5 is saturated and by subsequent acidification, 4,5-dihydroallo-19-nor-testololactone is produced.

The 1-dehydro derivative of the latter compound is formed by refluxing the 4,5-dihydroallo-19-nor-testololactone with aqueous alkali, such as sodium hydroxide, to open the lactone ring and thus furnish the sodium salt of 19-nor-dihydrotestololactonic acid which upon treatment with acid at low temperature for a short time is converted into the free 19-nor-dihydroallotestololactonic acid. Monobromination at C–2 is then effected by the addition of a slight excess of a molar equivalent of bromine in acetic acid and in the presence of a slight excess of a molar equivalent of sodium acetate, which is then followed by dehydrobromination as by refluxing with γ-collidine to form the 1-dehydro-4,5-dihydroallo-19-nor-testolactonic acid. The latter compound upon heating with acid for several hours is cyclized to the 1-dehydro-4,5-dihydro-allo-19-nor-testololactone.

Alternatively, the starting 3-methyl ether of methyl estrololactonic acid can be subjected directly to Birch reduction whereby the intermediate 3-methoxy-13:17-seco-2:5(10)-estradien-3,17-diol is produced in a single step. However the process results with better yields when carried out in accordance with Reaction Diagram I as set out above.

The production of the 2-methyl derivatives of 4,5-dihydroallotestololactone, according to the process of our invention, is illustrated by the following Reaction Diagram II in which Z has the above-explained meaning.

REACTION DIAGRAM II

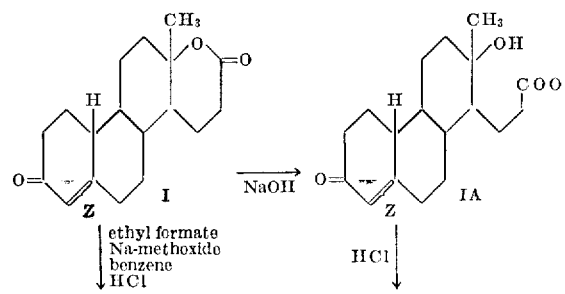

In practicing the process outlined above, 19-nor-testololactone (I) or 4,5-dihydroallo-19-nor-testololactone (I) is treated in benzene solution with ethyl formate in the presence of sodium methoxide, followed by acidification of the reaction product with hydrochloric acid to produce 2-hydroxymethylene-19-nor-testololactone or 2-hydroxymethylene - 4,5 - dihydroallo - 19 - nor-testololactone (II) which is then hydrogenated in methanol solution and in the presence of palladium on carbon to obtain 2α-methyl-4,5-dihydroallo-19-nor-testololactone (III).

We have further made the surprising discovery that unexpectedly, the yield of the above method of carrying out this phase of the process of our invention in practice, can be improved and undesirable side reactions leading to condensations at C–16 which occur in the above described process step can be eliminated by another method of carrying out the process according to the invention.

This improved mode of operation comprises the conversion of the starting material I to the corresponding 19-nor-testololactonic or 4,5-dihydroallo-19-nor-testololactonic acid (IB) by first reacting the starting material with an alkali metal hydroxide under nitrogen, and then acidifying the intermediate (IA) with a dilute mineral acid such as hydrochloric acid.

The acid intermediate (IB) is then subjected to the same treatment as set forth previously in order to obtain 2-hydroxymethylene-19-nor-testololactone or 2-hydroxymethylene-4,5-dihydroallo-19-nor-testololactone (II) and thereafter 2α-methyl-4,5-dihydroallo-19-nor-testololactone (III).

The intermediary 2-hydroxymethylene derivatives of general Formula II are converted by conventional esterification with the aid of a hydrocarbon carboxylic acid anhydride or chloride to the respective 2-acyloxy methylene derivatives (IIA) according to the reaction equation:

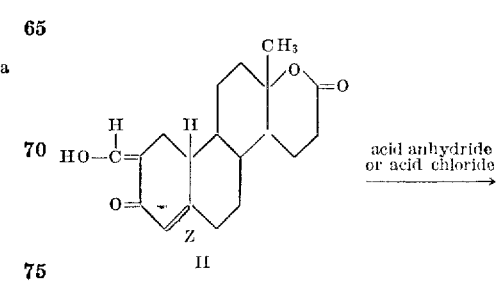

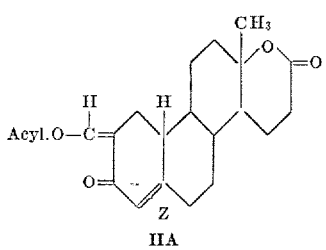

IIA

The following phase in the process according to our invention comprises more particularly a novel method illustrated in the following Reaction Diagram III.

REACTION DIAGRAM III

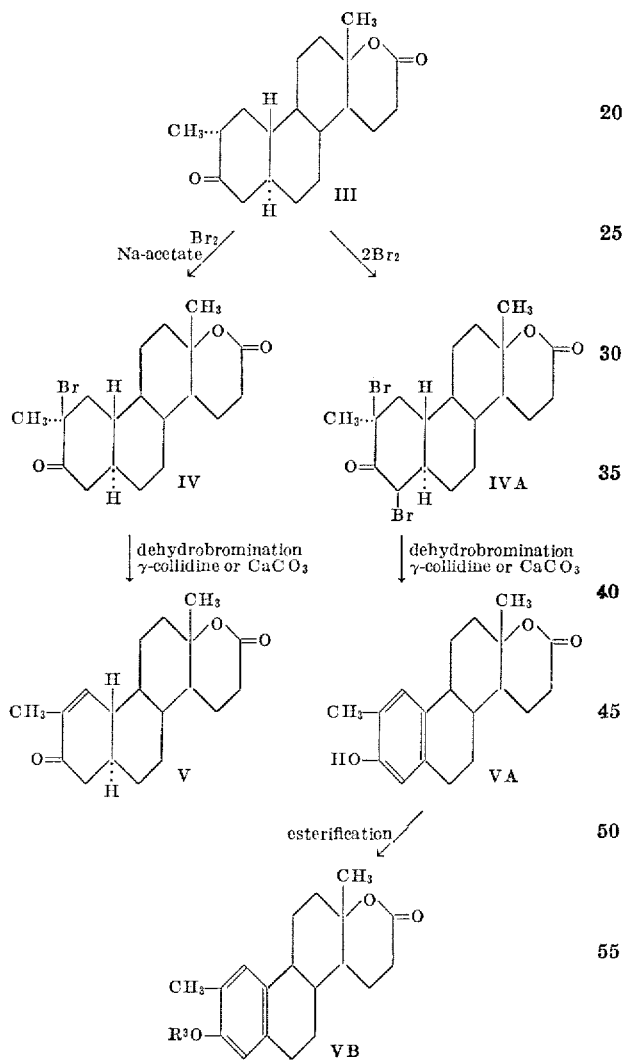

In the above equation, $R^3$ represents a hydrocarbon carboxylic acyl group containing up to 12 carbon atoms of the same type as set forth previously.

According to this method we introduced a double bond at C–1 alone by first treating a solution of 2α-methyl-4,5-dihydroallo-19-nor-testololactone (III) in acetic acid with a solution of approximately 1 molar equivalent of bromine in acetic acid containing 1 molar equivalent of sodium acetate, followed by dehydrobromination of the resulting 2-methyl - 2 - bromo-4,5-dihydroallo-19-nor-testololactone (IV) to 2-methyl-1-dehydro-4,5-dihydroallo-19-nor-testololactone (V), by refluxing with γ-collidine or by reaction with calcium carbonate in mixture with dimethylacetamide. Alternatively, by treatment of 2α-methyl-4,5-dihydroallo-19-nor-testololactone (III) with about 2 molar equivalents of bromine in acetic acid, without, however, adding sodium acetate, followed by dehydrobromination of the resulting 2-methyl-2,4-dibromo-4,5-dihydroallo-19-nor-testololactone (IVA) as described above to the novel 2-methyl-estrolactone (VA). The terms "estrolactone" and "estrololactone" are both used in the literature for the same compound.

By treatment of the 2-methyl-estrolactone with acid anhydrides such as acetic anhydride in pyridine in a conventional manner, there are obtained the 3-esters and particularly the 3-acetate of 2-methyl-estrolactone.

We thus found unexpectedly, that the treatment with one mole of bromine of the novel 2-methyl-4,5-dihydroallo-19-nor-testololactone (III) leads to a selective introduction of bromine at C–2, i.e., by substitution of the tertiary hydrogen atom at C–2 (IV) and the treatment with 2 moles of bromine leads to the formation of the 2,4-dibromo compound (IVA), while no or negligible bromination takes place at ring D, for instance, at C–16, i.e., in the α-position relative to the 17-keto group although C–16 corresponds to C–2 in that it is in α-position to the 3-keto group and a similar bromination was therefore to be expected at both carbon atoms.

According to another important feature of our invention, the new 2α-methyl-4,5-dihydroallo-19-nor-testololactone (III) in the above Reaction Diagram II can be converted as illustrated in Reaction Diagarm IV below, by reduction of the 3-keto group to the corresponding 19-nor-andrololactone derivatives.

REACTION DIAGRAM IV

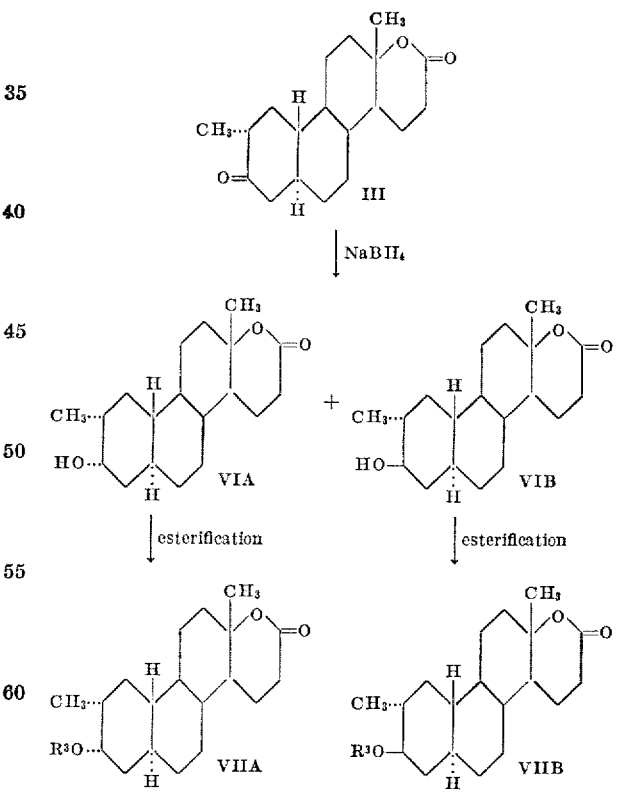

In the above equation, $R^3$ has the same meaning as set forth previously.

According to the above illustrated phase of the process according to our invention, the reaction of a solution of 2α-methyl-4,5-dihydroallo-19-nor-testololactone (III) in dioxane with sodium borohydride dissolved in water, followed by heating the reaction product with hydrochloric acid yields a mixture of 2α-methyl-19-nor-andrololactone (VIA) and 2α-methyl-19-nor-epi-andrololactone (VIB); the stereoisomers are separated by chromatography. The hydroxy group at C–3 present in the latter cmpounds VIA and VIB is esterified by employing conventional techniques, and esters VIIA and VIIB are thus obtained.

By the same reduction with sodium borohydride in dioxane as described in Reaction Diagram IV, 2-methyl-1-dehydro-4,5-dihydroallo-19-nor-testololactone (V) is converted to a mixture of the corresponding 3α- and 3β-hydroxy derivatives VIIIA and VIIIB, respectively as shown in Reaction Diagram V below.

REACTION DIAGRAM V

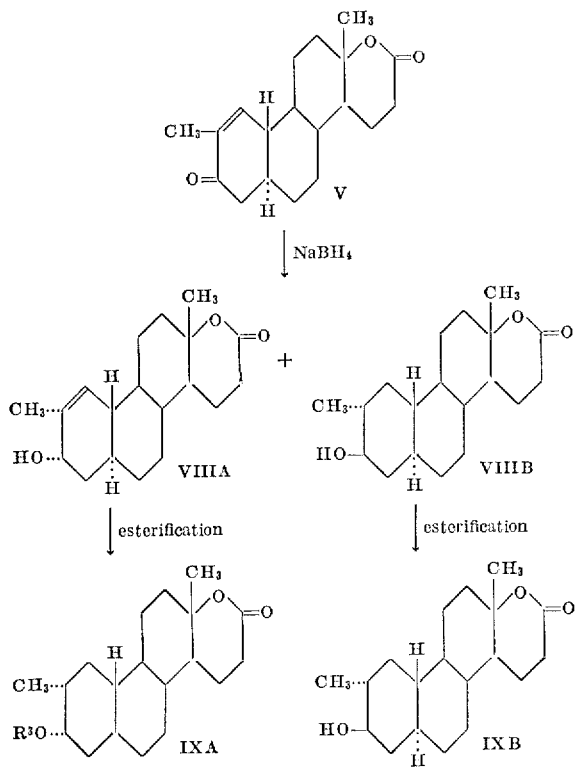

In the above reaction diagram, $R^3$ has the same meaning as hereinabove set forth.

Esterification by conventional methods yields the 3-acyloxy derivatives of the aforesaid compounds, corresponding to Formulae IXA and IXB.

The conditions of the aforementioned reactions as described in detail in the examples given hereinafter, can be modified within relatively wide limits. The following are some of the possible modifications: the introduction of the hydroxymethylene group can also be achieved in the presence of a catalyst other than sodium methoxide, such as sodium hydride; the dehydrogenation at C–1 can be effected, although with inferior yields, by microbiological methods, such as incubation with *Corynebacterium simplex* ATCC 6946.

The invention is further illustrated but not limited by the following examples:

*Example I*

A mixture of 10 g. of the 3-methyl ether of methyl-estrololactonic acid, 500 ml. of tetrahydrofuran and 10 g. of lithium aluminum hydride was refluxed for 1 hour. Aqueous saturated sodium sulfate solution and then anhydrous sodium sulfate was added, the solid was filtered and the filtrate was evaporated. Recrystallization of its residue from hexane-ether yielded 3-methoxy-13:17-seco-1:3:5(10)-estratiene-13,17-diol.

Liquid ammonia (1.5 l.) was carefully added to a solution of 10 g. of the above compound, in 700 ml. of dry redistilled propyleneglycol monomethyl ether (Dowanol 33–B), the reaction being carried out in a well-lagged 10 l. flask. Lithium wire (17 g.) was added gradually during 20 minutes with vigorous stirring and the reaction allowed to proceed for 2 hours, when the blue color had disappeared. The mixture was diluted with 5 l. of water and the precipitate was collected, washed with water and taken up in hot benzene. The benzene solution was washed thoroughly with water, dried and evaporated. The residual crude enol-ether, or the crude 3-methoxy-13:17-seco-2:5(10)-estradiene-13,17-diol showed no absorption maximum in the ultraviolet, whereas the infrared spectrum (in carbon disulfide) showed bands at 1600 and 1690 cm.$^{-1}$, as expected for the 1,4-dihydroanisole grouping.

The aforementioned crude product was dissolved in 500 cc. of methanol and heated at 60° C. for 15 minutes with 250 ml. of 3 N hydrochloric acid. Dilution with water, followed by extraction with ethyl-acetate and crystallization from acetone, yielded 5.4 g. of 13:17-seco-4-estrene-13,17-diol.

8 g. of the foregoing compound were dissolved in 300 ml. of glacial acetic acid and 3.0 g. of chromium trioxide, dissolved in 120 ml. of 50% acetic acid were added, slowly, stirring and maintaining a temperature below 20° C. Stirring was then continued at room temperature for 1 hour and the mixture was finally poured into 2 liters of ice water. The precipitate was collected, washed with water and air-dried. Thus a mixture of 19-nor-testololactonic acid and 19-nor-testololactone was obtained.

The mixture as described above was stirred with 200 cc. of aqueous hydrochloric acid 3 N at room temperature for 12 hours. The solid was then filtered, washed with water and repeatedly recrystallized from acetone-hexane. Thus pure 19-nor-testololactone was obtained.

*Example II*

A solution of 4 g. of 19-nor-testololactone prepared as described in Example I, in dioxane-ether (1:1, 200 ml.) was added in a steady stream to a solution of 320 mg. of lithium in 350 ml. of liquid ammonia, with good stirring. 10 g. of ammonium chloride were then added and the ammonia allowed to evaporate. The residue was stirred with 100 cc. of 3 N-hydrochloric acid for 12 hours at room temperature, then extracted with ether to give a product which was adsorbed from 200 ml. of benzene onto 75 g. of alumina. Elution with benzene-ether (80:20, 1000 ml.) afforded 4,5-dihydroallo-19-nor-testololactone.

*Example III*

3 g. of 19-nor-dihydroallotestololactone of the foregoing example were heated under nitrogen for 1½ hours on the steam bath with 15 ml. of 10% aqueous sodium hydroxide and 150 ml. of water. The solution was cooled to 0° C. and acidified with 13 ml. of 3 N hydrochloric acid to about pH 3. The crude 19-nor-dihydroallotestololactonic acid which precipitated was filtered, washed with water, dried in vacuo and then dissolved in 150 ml. of glacial acetic acid. The solution was then treated with 30 ml. of glacial acetic acid containing 1.1 molar equivalents of bromine and 1.1 molar equivalents of sodium acetate. The brominating solution was added slowly with stirring and keeping the temperature of the mixture below 20° C. When decolorization occurred, the mixtured was poured into ice water, the solid collected, washed with water and dried in vacuo. Thus a mixture of 2α-bromo-19-nor-dihydroallotestololactone and 2α-bromo-13:17-seco-19-nor-5α-androstan-13-ol-17-oic acid was obtained. The solid was dissolved in 15 ml. of dimethylacetamide; the resulting solution was added slowly, while stirring, to a refluxing suspension of 2.2 g. of calcium carbonate in 45 ml. of dimethylacetamide and refluxing was continued for 15 minutes; the chilled mixture was poured into ice water, acidified by addition of 3 N hydrochloric acid and the solid collected by filtration. Thus a mixture of 13:17-seco-19-nor-Δ$^1$-5α-androsten-13-ol-17-oic acid and of 19-nor-1-dehydro-dihydroallotestololactone was obtained. Treatment of the aforesaid mixture with aqueous hydrochloric acid, followed by recrystallization from acetone-hexane, afforded pure 19-nor-1-dehydro-dihydroallotestololactone.

Example IV

A mixture of 5 g. of 19-nor-testololactone, prepared as described in Example I, 175 cc. of anhydrous benzene free of thiophene, 1 g. of sodium methoxide and 10 cc. of ethylformate was stirred at room temperature for 4 hours. The precipitate was collected by filtration and added with vigorous stirring to 200 cc. of ice-water containing 10 cc. of concentrated hydrochloric acid. The stirring was continued for 4 hours at room temperature and the solid was collected, washed with water, dried and recrystallized from acetone-hexane, thus yielding 2-hydroxymethylene-19-nor-testololactone.

Example V

One gram of 19-nor-testololactone is refluxed for three hours in mixture with 100 cc. of an aqueous solution of sodium hydroxide having a concentration of 2 g. of NaOH per liter, under an atmosphere of nitrogen. After cooling to 0° C., the mixture is acidified with diluted hydrochloric acid which latter is added dropwise until the mixture has attained a pH of 3. The resulting precipitate is separated by filtration, washed with water and then dried under reduced pressure, whereby 19-nor-testololactonic acid is obtained.

A mixture of 2.8 g. of 19-nor-testololactonic acid, 200 cc. of benene, 3 g. of sodium methoxide, and 10 cc. ethylformate is stirred for five hours under an atmosphere of nitrogen and at room temperature. The resulting precipitate is filtered off, washed consecutively with benzene and hexane, and dried under reduced pressure. The resulting product in powder form is added to a mixture of 200 cc. of water and 50 cc. of concentrated hydrochloric acid, which is then stirred at room temperature for 72 hours. The resulting solid phase is separated by filtration, washed with water, dried and recrystallized from acetone-hexane, whereby 2-hydroxymethylene-19-nor-testololactone identical with the final product of Example IV is obtained in a considerably higher yield.

Example VI

Example V was repeated with 4,5-dihydroallo-19-nor-testololactone prepared in Example II as the starting material, and there was first obtained 4,5-dihydroallo-19-nor-testololactonic acid, and the 2-hydroxy-methylene-4,5-dihydroallo-19-nor-testololactone.

Example VII 5 g. of 4,5-dihydroallo-19-nor-testololactone prepared as described in Example II was treated with ethylformate, as described for this reaction in Example IV to produce 2-hydroxymethylene-4,5-dihydroallo-19 - nor - testololactone.

A solution of 3 g. of the above compound in 100 cc. of methanol containing 600 mg. of a pre-reduced 5% palladium on carbon catalyst was hydrogenated at room temperature until the equivalent of 2 moles of hydrogen had been adsorbed; the catalyst was removed by filtration, the methanol was evaporated and the residue crystallized from acetone-hexane, thus affording 2α-methyl-4,5-dihydro-allo-19-nor-testololactone.

Example VIII

To a solution of 2 g. of 2α-methyl-4,5-dihydroallo-19-nor-testololactone, produced according to Example VII, in 100 cc. of glacial acetic acid, there was slowly added 50 cc. of glacial acetic acid containing 1.1 molar equivalent of bromine and 1.1 molar equivalent of sodium acetate, under stirring and while maintaining the temperature below 20° C. Stirring was continued until almost complete decoloration of the reaction mixture had been attained; the mixture was then poured into ice-water; the resulting precipitate was collected, washed with water and dried under reduced pressure. There was thus obtained the crude 2-methyl-2-bromo-4,5-dihydroallo-19-nor-testololactone. This crude product was refluxed for one hour with 50 cc. of collidine and the mixture was cooled, diluted with ether, filtered, washed with dilute hydrochloric acid and then with water to neutral, dried and evaporated to dryness; recrystallization of the residue from acetone-hexane afforded 2-methyl-1-dehydro-4,5-dihydroallo-19-nor-testololactone.

Example IX

A solution of 3 g. of 2-methyl-2-bromo-4,5-dihydroallo-19-nor-testololactone, prepared in accordance with the previous example, in 20 cc. of dimethylacetamide was added to a boiling suspension of 1.5 g. of calcium carbonate in 30 cc. of dimethylacetamide and the mixture was refluxed for 15 minutes, cooled, acidified with concentrated hydrochloric acid to a strong acidic reaction. The mixture was heated for one hour on a steam bath, cooled, and diluted with ice-water, and the resulting precipitate was collected by filtration, washed with water, dried and recrystallized from acetone-hexane. There was thus obtained 2-methyl-1-dehydro-4,5-dihydroallo-19-nor-testololactone, identical with final compound in the previous example.

Example X

By following the procedure of Example VIII, 2 g. of 2α-methyl-4,5-dihydroallo-19-nor-testololactone was treated with 2 equivalents of bromine in glacial acetic acid, but in the absence of sodium acetate which serves as a buffer in the method of Example VIII. There was obtained 2-methyl-2,4-dibromo-4,5-dihydroallo - 19 - nor-testololactone in crude form, which was divided in two parts. Each part was then dehybrominated, one by the method described in Example VIII and the other by the method described in Example IX. In both cases there was obtained 2-methyl-estrolactone.

A mixture of 500 mg. of this compound, 2 cc. of pyridine and 2 cc. of acetic anhydride was allowed to remain at room temperature overnight. After the usual work up the acetate of 2-methyl-estrolactone was obtained.

Example XI

To a solution of 2 g. of 2α-methyl-4,5-dihydroallo-19-nor-testololactone obtained according to Example VII in 50 cc. of dioxane, there was slowly added a solution of 500 mg. of sodium borohydride in 10 cc. of water, under stirring at room temperature; stirring was continued for two hours, the excess of hydride was decomposed by the addition of acetic acid and then 2 cc. of concentrated hydrochloric acid was added. The mixture was heated on the steam bath for one hour, then poured into ice-water, and the resulting precipitate was collected by filtration, washed with water and dried; there was thus obtained a mixture of 2α-methyl-19-nor-andrololactone (3α-OH) and of 2α-methyl-19-nor-epi-andrololactone (3β-OH). The stereoisomers were separated by chromatography on neutral alumina.

Example XII

A solution of 1 g. of 2-hydroxymethylene-19-nortestololactone in 5 cc. of pyridine was treated with 1 cc. of acetic anhydride; on the next day the reaction mixture was poured into water, the formed precipitate was collected, washed with water, dried and recrystallized from acetone-hexane. There was thus obtained 2-acetoxymethylene-19-nor-testololactone.

Example XIII

A solution of 1 g. of 2-hydroxymethylene-4,5-dihydroallo-19-nor-testololactone in 5 cc. of pyridine was treated with 1 g. of benzoyl chloride, kept at room temperature for 24 hours, poured into water, heated for one hour on the steam bath, cooled and the precipitate was collected, washed with water, dried and recrystallized from acetone-hexane. There was thus obtained 2-benzoyloxymethylene-4,5-dihydroallo-19-nor-testololactone.

*Example XIV*

A mixture of 1 g. of 2α-methyl-19-nor-epi-andrololactone, 5 cc. of pyridine and 2 cc. of cyclopentylpropionic acid anhydride was kept for 48 hours at room temperature, poured into water, heated for 2 hours on the steam bath and cooled. The precipitate was collected, washed with water, dried and recrystallized from acetone-hexane, thus affording 2α-methyl-19-nor-epi-andrololactone cyclopentylpropionate.

*Example XV*

1 g. of 2-hydroxymethylene-19-nor-testololactone was dissolved in 20 cc. of anhydrous n-propyl alcohol, one drop of perchloric acid was added and the solution allowed to stand for 10 minutes at room temperature. 1 cc. of pyridine was added and almost all of the solvent removed in vacuo. Water was added, the product extracted with ether and then crystallized from hot hexane to yield 2-propoxymethylene-19-nor-testololactone.

The same method applied to 2-hydroxymethylene-4,5-dihydroallo-19-nor-testololactone gave the corresponding 2-propoxy derivative.

*Example XVI*

Following the method of the previous example except that methyl alcohol and benzyl alcohol were substituted for the propyl alcohol there were obtained the corresponding methyl and benzyl ethers of 2-hydroxymethylene-19-nor-testololactone and of 2-hydroxymethylene-4,5-dihydroallo-19-nor-testololactone.

*Example XVII*

By following the procedure of Example XI, 2-methyl-1-dehydro-4,5-dihydroallo-19-nor-testololactone, obtained in Example VIII, was converted into a mixture of 2-methyl-1-dehydro-19-nor-andrololactone and 2-methyl-1-dehydro-19-nor-epi-andrololactone, which were separated by chromatography on neutral alumina.

*Example XVIII*

By applying the method of Example XIV, 2-methyl-1-dehydro-4,5-dihydroallo-19-nor-testololactone, 2-methyl-1-dehydro-19-nor-andrololactone and 2-methyl-1-dehydro-19-nor-epi-andrololactone were converted into the corresponding 2 - methyl-1-dehydro-4,5-dihydroallo-19-nor-testololactone cyclopentylpropinate, 2-methyl-1-dehydro-19-nor-andrololactone cyclopentylpropionate and 2-methyl-1-dehydro-19-nor-epi-andrololactone cyclopentylpropionate.

By substituting acetic anhydride, or propionic anhydride or benzoyl chloride for the cyclopentylpropionic anhydride, there were obtained the corresponding acetates, propionates and benzoates of 2-methyl-1-dehydro-4,5-dihydroallo-19-nor-testololactone, 2-methyl-1-dehydro-19-nor-andrololactone and of 2-methyl-1-dehydro-19-nor-epi-andrololactone.

We claim:
1. A compound of the following formula:

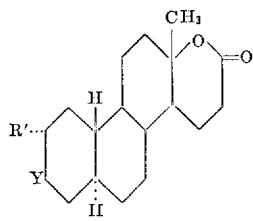

wherein R' is methyl and Y is selected from the group consisting of keto, α-hydroxy, β-hydroxy, α-hydrocarbon carboxylic acyloxy of up to 12 carbon atoms and β-hydrocarbon carboxylic acyloxy of up to 12 carbon atoms.

2. 2α-methyl-4,5-dihydroallo-19-nor-testololactone.
3. 2α-methyl-19-nor-andrololactone.
4. 2α-methyl-19-nor-epi-andrololactone.
5. The hydrocarbon carboxylic acid ester of up to 12 carbon atoms of 2α-methyl-19-nor-epi-andrololactone.
6. The hydrocarbon carboxylic acid ester of up to 12 carbon atoms of 2α-methyl-19-nor-epi-androlocatone.
7. A compound of the following formula:

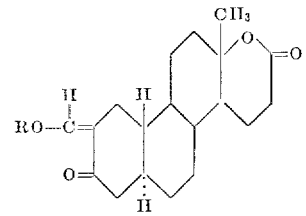

wherein R is selected from the group consisting of hydrogen, lower alkyl, aryl, lower aralkyl each containing up to 8 carbon atoms, and hydrocarbon carboxylic acyl of up to 12 carbon atoms.

8. 2-hydroxymethylene-4,5-dihydroallo-19-nor - testololactone.
9. The hydrocarbon carboxylic acid ester of up to 12 carbon atoms of 2-hydroxymethylene-4,5-dihydroallo-19-nor-testololactone.
10. The lower alkyl ether of 2-hydroxymethylene-4,5-dihydroallo-19-nor-testololactone.
11. The benzyl ether of 2-hydroxymethylene-4,5-dihydroallo-19-nor-testololactone.
12. A compound of the formula:

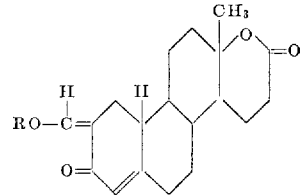

wherein R is selected from the group consisting of hydrogen, lower alkyl, aryl, lower aralkyl each containing up to 8 carbon atoms, and hydrocarbon carboxylic acyl of up to 12 carbon atoms.

13. 2-hydroxymethylene-19-nor-testololactone.
14. The hydrocarbon carboxylic acid ester of up to 12 carbon atoms of 2-hydroxy-methylene-19-nor-testololactone.
15. The lower alkyl ether of 2-hydroxymethylene-19-nor-testololactone.
16. The benzyl ether of 2-hydroxymethylene-19-nor-testololactone.
17. A compound having the following formula:

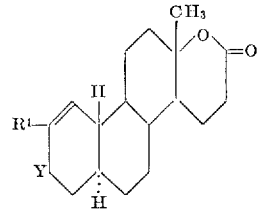

wherein R' is selected from the group consisting of hydrogen and methyl and Y is selected from the group consisting of keto, α-hydroxy, β-hydroxy, α-hydrocarbon carboxylic acyloxy of up to 12 carbon atoms and β-hydrocarbon carboxylic acyloxy of up to 12 carbon atoms.

18. 2-methyl-1-dehydro-4,5-dihydroallo-19-nor - testololactone.
19. 1-dehydro-4,5-dihydroallo-19-nor-testololactone.
20. 2-methyl-1-dehydro-19-nor-andrololactone.
21. 2-methyl-1-dehydro-19-nor-epi-andrololactone.
22. The hydrocarbon carboxylic acid ester of up to 12 carbon atoms of 2-methyl-1-dehydro-19-nor-andrololactone.

23. The hydrocarbon carboxylic acid ester of up to 12 carbon atoms of 2-methyl-1-dehydro-19-nor-epi-andrololactone.

References Cited in the file of this patent

UNITED STATES PATENTS

| | | |
|---|---|---|
| 2,499,248 | Pincus et al. | Feb. 28, 1950 |
| 2,806,038 | Picha | Sept. 10, 1957 |
| 2,855,404 | Richards | Oct. 7, 1958 |
| 2,946,807 | Fried et al. | July 26, 1960 |

OTHER REFERENCES

Levy et al.: Jour. Biol. Chem., vol. 171 (1947), pages 71–79.

Jacobsen: Jour. Biol. Chem., vol. 171 (1947), page 62.

Fried et al.: Jour. Amer. Chem. Soc., vol. 75 (1953), page 5764

Leeds et al.: Jour. Amer. Chem. Soc., vol 76 (1954), pages 2265–2266

Fieser et al.: Steroids, Reinhold, New York (1959), pages 586, 587 and 591.

Gordan: Chemical Abstracts, vol. 52 (1958), page 8355.

Wendler et al.: Jour. Amer. Chem. Soc., vol. 77 (1955), pages 3559–3561.

Hogg et al.: Jour. Amer. Chem. Soc., vol. 77 (1955), pages 6401, 6402.

UNITED STATES PATENT OFFICE
CERTIFICATE OF CORRECTION

Patent No. 3,099,659                      July 30, 1963

Fred A. Kincl et al.

It is hereby certified that error appears in the above numbered patent requiring correction and that the said Letters Patent should read as corrected below.

Column 12, line 3, after "-nor-" strike out "epi-".

Signed and sealed this 21st day of January 1964.

(SEAL)
Attest:
ERNEST W. SWIDER

Attesting Officer

EDWIN L. REYNOLDS

Acting Commissioner of Patents